July 18, 1961  S. C. MOON  2,992,722
MINE CONVEYOR
Filed April 19, 1957  6 Sheets-Sheet 1
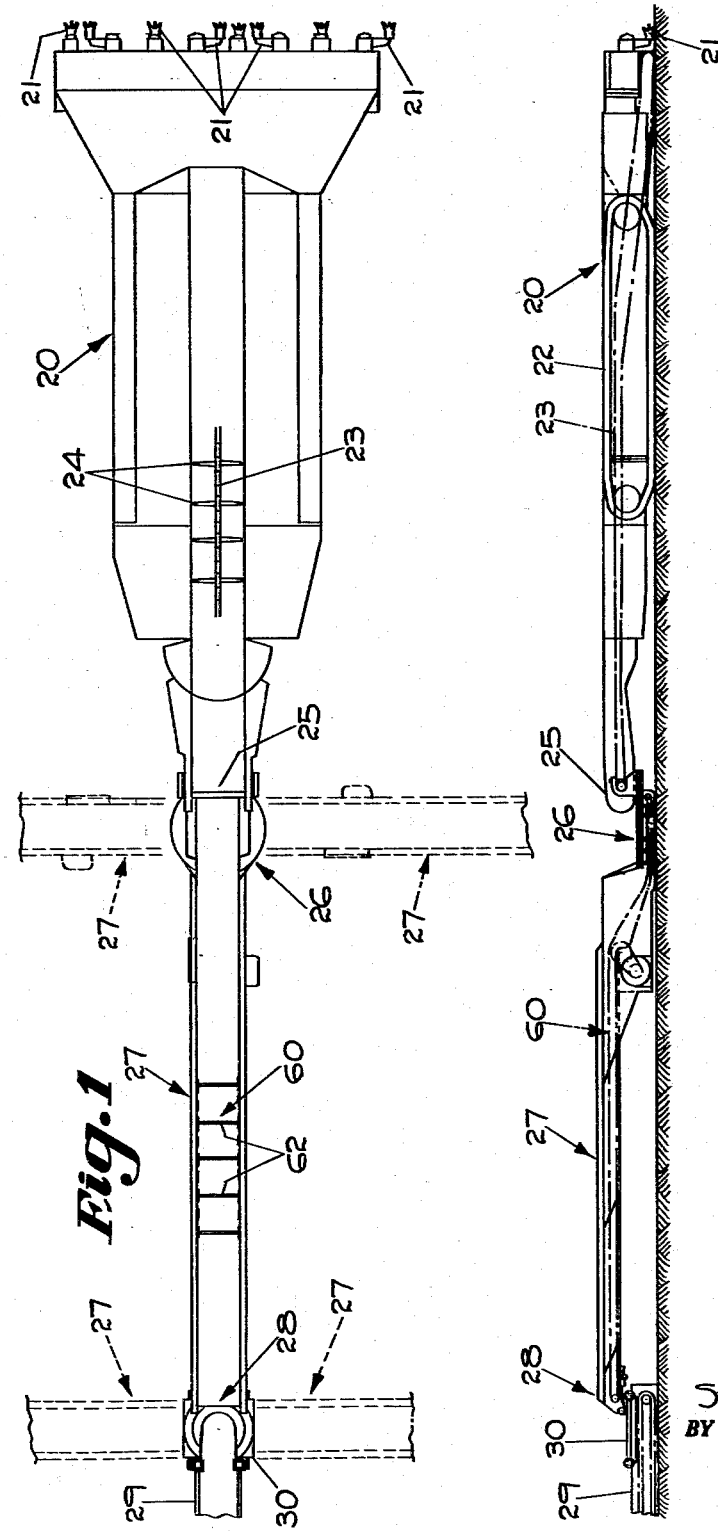
INVENTOR;
STERLING C. MOON,
BY David Young
ATT'Y.

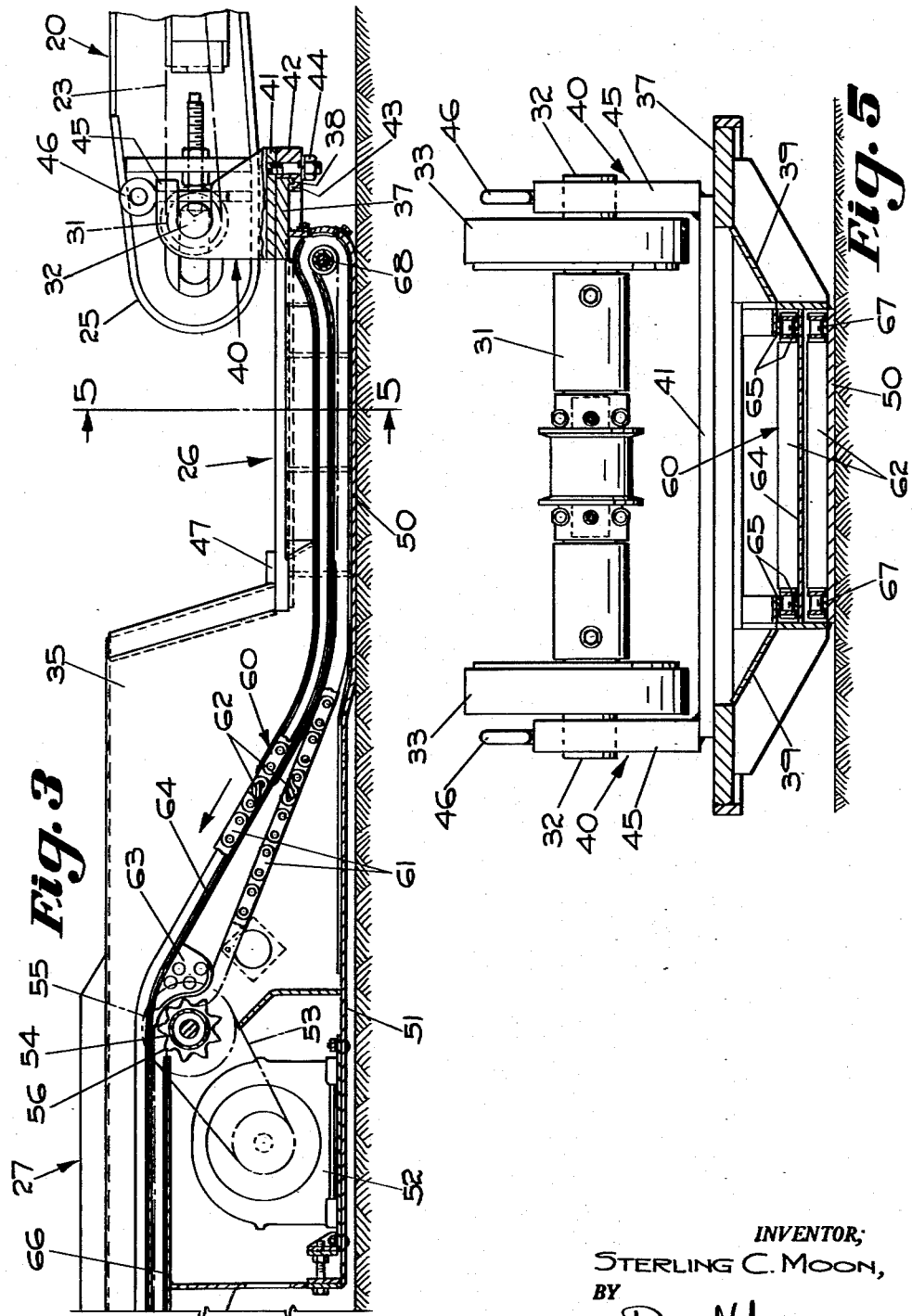

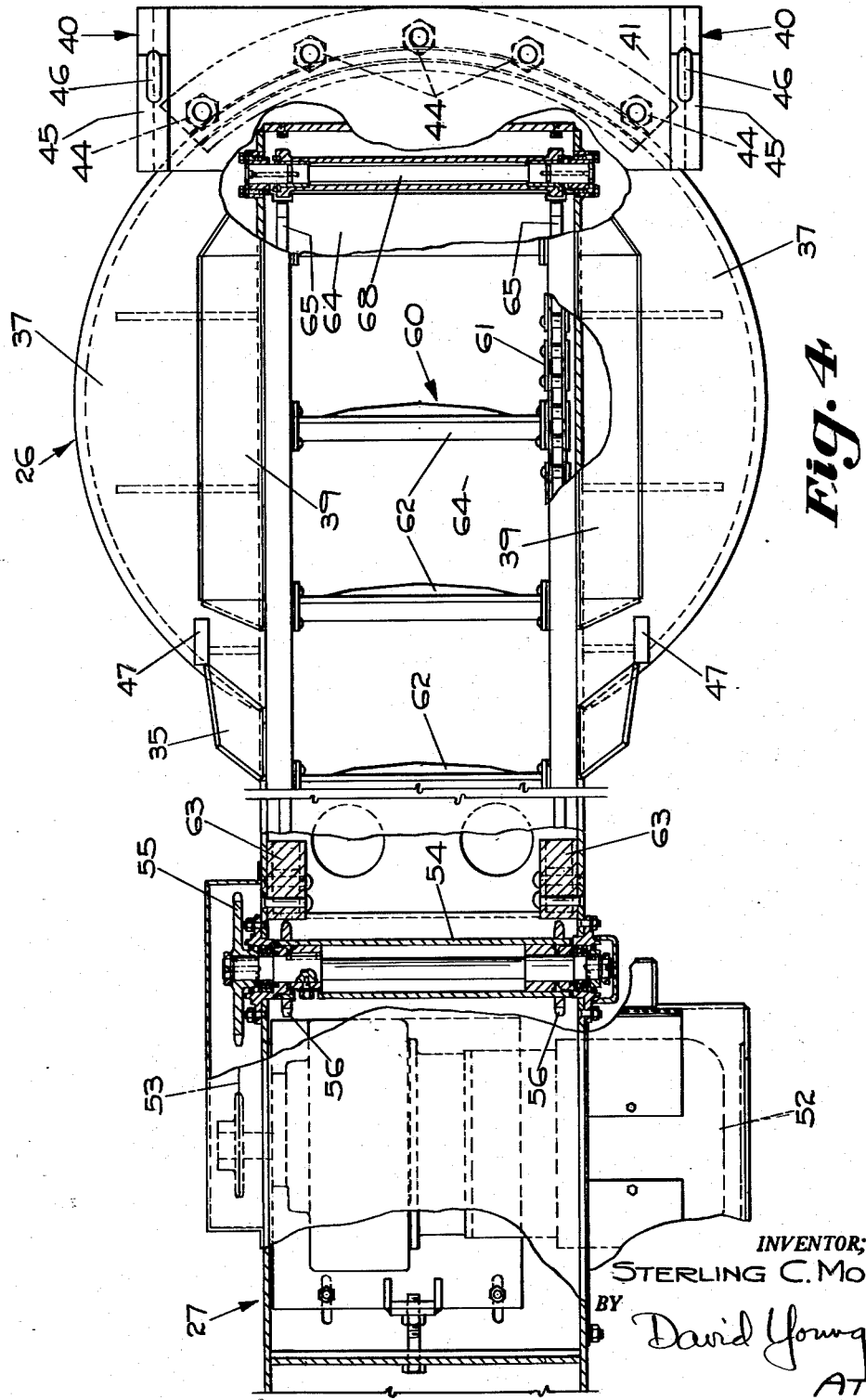

July 18, 1961 S. C. MOON 2,992,722
MINE CONVEYOR
Filed April 19, 1957 6 Sheets-Sheet 4
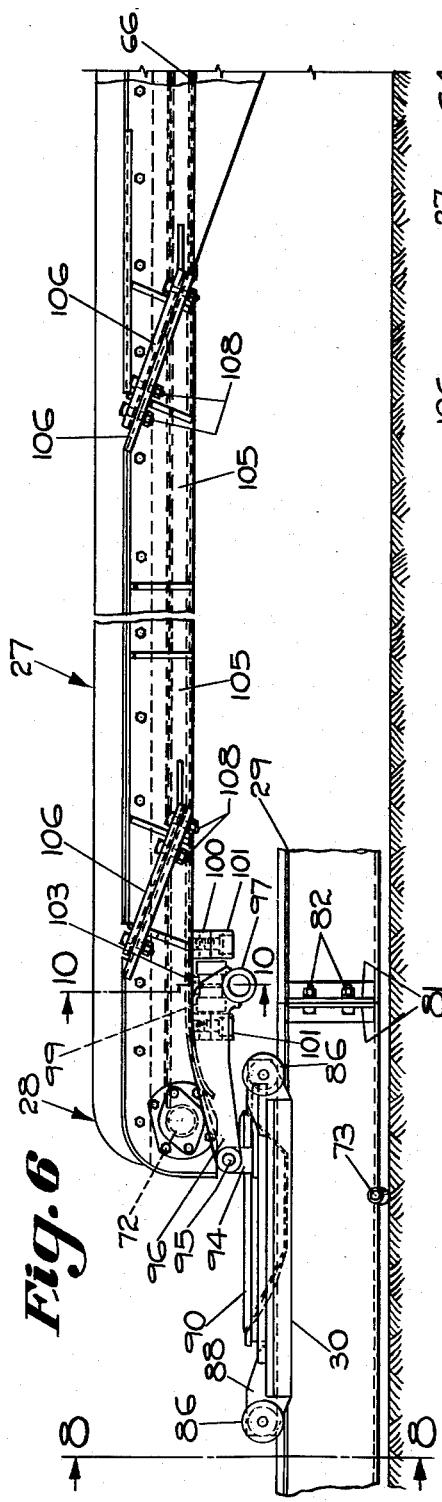
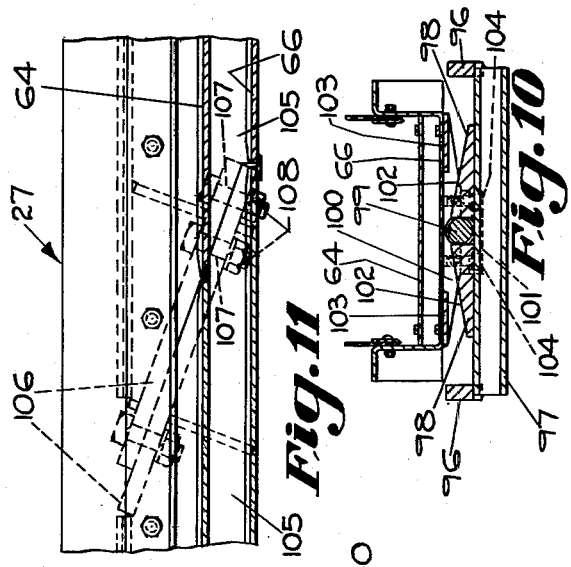
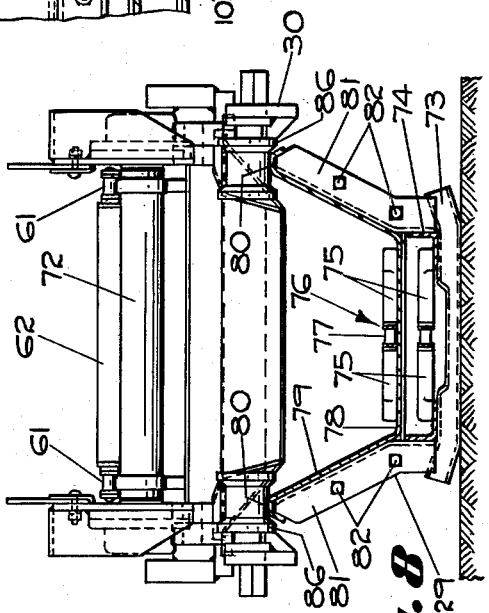
INVENTOR:
STERLING C. MOON,
BY David Young
ATT'Y.

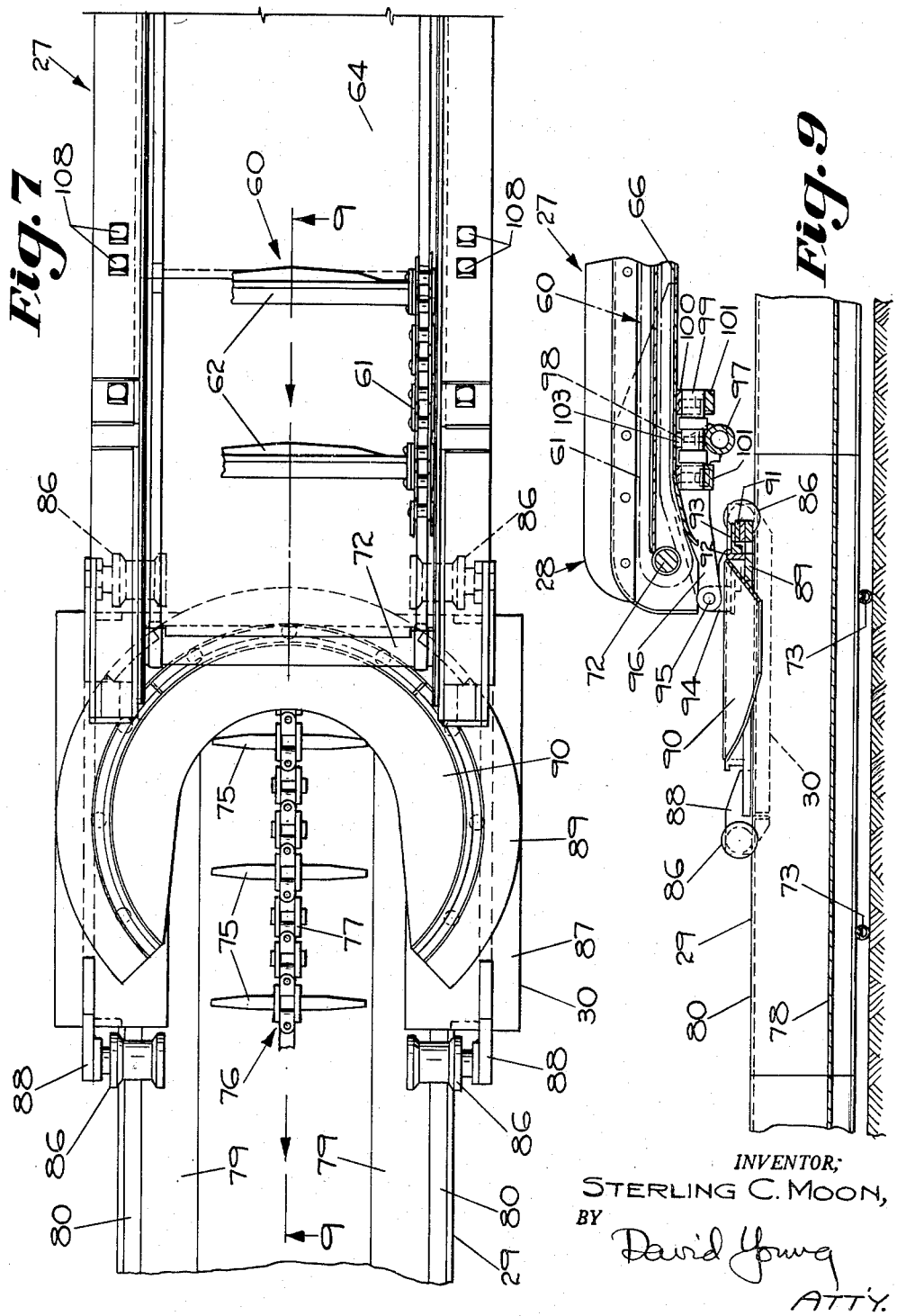

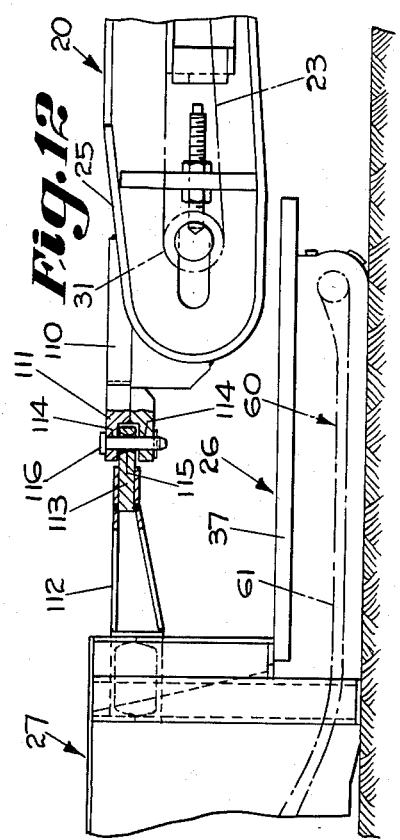

United States Patent Office 2,992,722
Patented July 18, 1961

2,992,722
MINE CONVEYOR
Sterling C. Moon, Dublin, Ohio, assignor to The Jeffrey
Manufacturing Company, a corporation of Ohio
Filed Apr. 19, 1957, Ser. No. 653,769
4 Claims. (Cl. 198—95)

The instant invention relates to conveyors which are particularly adapted for mining operations, and more particularly to an improved conveyor assembly comprising a bridge conveyor connecting a continuous mining machine to a pan conveyor.

It is a prime object of the instant invention to provide an improved conveyor assembly comprising a bridge conveyor adapted to be connected to the discharge end of a continuous mining machine for receiving mined material therefrom, and a pan conveyor which is connected to the bridge conveyor and receives material therefrom for carrying the material out of the mine, or to another point in the mine, at which the material can be delivered to shuttle cars, or like conveyances, which carry the mined material out of the mine.

It is another object of the instant invention to provide an improved conveyor assembly including a bridge conveyor adapted to connect the discharge end of a continuous mining machine to a pan conveyor, having improved means for supporting the bridge conveyor between the mining machine and the pan conveyor.

It is a further object of the instant invention to provide an improved conveyor assembly including a bridge conveyor for connecting the discharge end of a continuous mining machine to a pan conveyor, and in which the bridge conveyor is supported between the mining machine and the pan conveyor by means permitting the bridge conveyor to freely shift its position about an axis extending longitudinally thereof.

It is also an object of this invention to provide an improved conveyor assembly including a bridge conveyor for connecting a continuous mining machine to a pan conveyor, including improved means for supporting the bridge conveyor on the mining machine and on the pan conveyor, and in which the bridge conveyor can be swung laterally relatively to the mining machine and to the pan conveyor.

It is still another object of the instant invention to provide an improved conveyor assembly comprising a bridge conveyor connecting a continuous mining machine to a pan conveyor in which the bridge conveyor is supported on the pan conveyor by pivot means extending longitudinally and laterally of the bridge conveyor to permit the bridge conveyor to freely shift its position about the axes of said pivot means.

A further object of the invention is to provide an improved conveyor assembly comprising a bridge conveyor supported by a continuous mining machine and by a pan conveyor having means connecting the bridge conveyor to the mining machine and to the pan conveyor, said connecting means including loose connections permitting the bridge conveyor to freely shift its position relatively to the mining machine and to the pan conveyor.

Still another object of the instant invention is to provide an improved conveyor in which the frame of the conveyor comprises a plurality of like conveyor sections, joined end to end, in which the ends of the conveyor sections are formed on obliquely extending planes, with the conveyor frame sections being joined one to the other in said planes.

Other objects of the invention will appear hereinafter, the novel features and combinations being set forth in the appended claims.

In the accompanying drawings:

FIG. 1 is a plan diagramamtic view showing the instant invention in a conveyor assembly;

FIG. 2 is an elevational view of the conveyor assembly shown in FIG. 1;

FIG. 3 is a view partly in section showing the connection of the bridge conveyor to the mining machine;

FIG. 4 is a plan view of the material receiving end of the bridge conveyor including the hanger for connecting the bridge conveyor to the mining machine;

FIG. 5 is a sectional view taken on line 5—5 in FIG. 3;

FIG. 6 is a view showing the connection of the discharge end of the bridge conveyor to the pan conveyor;

FIG. 7 is a plan view of the structure shown in FIG. 6;

FIG. 8 is a view partly in section taken on the line 8—8 in FIG. 6;

FIG. 9 is a sectional view taken on line 9—9 in FIG. 7;

FIG. 10 is a sectional view taken on the line 10—10 in FIG. 6;

FIG. 11 is a longitudinal sectional view of the bridge conveyor, in the area of the joint between two like sections;

FIGS. 12 and 13 illustrate a modified structure for connecting the receiving end of the bridge conveyor to the mining machine;

FIGS. 14 and 15 illustrate a modified form of the means for connecting the discharge end of the bridge conveyor to the pan conveyor; and FIG. 16 is a detailed view of the loose connection between the mining machine and the bridge conveyor.

The instant invention relates to conveyors, and more particularly to a conveyor assembly adapted for underground mining operations, in which a continuous mining machine is employed, which is adapted to continuously advance into the mine face for removing material therefrom, and which includes a conveyor extending the length of the machine and is adapted to remove the mined material from the mine face to be discharged by the conveyor at the rear of the machine. The rear end of the mining machine has a bridge conveyor connected thereto for receiving the mined material from the mining machine, and the bridge conveyor is adapted to move the material to a pan conveyor which usually runs for substantial distances in the mine and delivers the mined material to a point, which may be located at some distance from the mining machine, and there discharged to shuttle cars or other conveyances for removal of the mined material from the mine.

The pan conveyor is a fixed installation in the mine, while the bridge conveyor is secured to the rear of the mining machine so that it follows the mining machine and is always in proper position in relation to the discharge end of the mining machine, for receiving the mined material discharged thereby. At the discharge end of the bridge conveyor there is provided means for supporting the bridge conveyor on and above the pan conveyor, to locate the discharge end of the bridge conveyor in proper position for discharge of the material to the pan conveyor, and includes means riding along the pan conveyor so that the bridge conveyor maintains proper connection therewith as it advances with the mining machine. The connections of the ends of the bridge conveyor to the mining machine and to the pan conveyor include means permitting the bridge conveyor to freely shift its position with respect to the mining machine and with respect to the pan conveyor, so that there may be adjustment for the uneven terrain found in the mine. Also, the bridge conveyor may swing laterally with respect to the mining machine and with respect to the pan conveyor so that the mining machine need not follow a straight-line path, but may follow diagonal lines in accordance with the location of the material in the mine.

Referring to the drawings, FIGS. 1 and 2, there is illustrated a continuous mining machine 20 provided with mining means 21 at the front end of the machine adapted to be fed into the mine face by the endless crawler traction means 22, disposed one at either side of the mining machine 20 to propel the machine. The mining machine 20 comprises an endless chain conveyor 23 including transversely extending flights 24 running the length of the machine 20 from the front to the rear thereof and moving the mined material from the front of the machine 20 to the material discharge boom 25 at the rear thereof. The material discharged by the conveyor 23 at the discharge boom 25 is received by the bridge conveyor 27 at the receiving end 26 thereof. The discharge end 28 of the bridge conveyor 27 is supported on the pan conveyor 29 by means including a carriage 30, which is adapted to ride along the pan conveyor 29 as the mining machine 20 is fed forwardly into the face of the mine. As illustrated in FIG. 1 in the dotted line views, the bridge conveyor 27 may be swung laterally to either side of the mining machine 20, and similarly may be swung laterally to either side of the pan conveyor 29.

The discharge boom 25 of the mining machine 20 comprises a head shaft 31 about which the endless conveyor 23 is entrained. The opposite ends 32 of the head shaft 31 extend beyond the sides of the frame 33 of the mining machine 20, and provide means for connecting the bridge conveyor 27 to the discharge end of the mining machine 20.

The bridge conveyor 27 is formed with a frame 35 having a material receiving end 26 adapted to be disposed below the discharge boom 25 of the mining machine 20. The receiving end 26 comprises a supporting track member 37 which extends laterally outwardly beyond the frame 35 on three sides thereof, and has a periphery formed on the arc of a circle with a downwardly extending lip 38. The inner part of the track member 37 is open and has welded thereto a hopper 39 which directs the material downwardly and inwardly to the conveying means 60 of the bridge conveyor 27. The head shaft 31 on the discharge boom 25 of the mining machine 20 is disposed above and outwardly beyond the hopper 39, so that the material discharged by the conveyor 23 of the mining machine 20 will be directed centrally of the hopper 39.

The discharge boom 25 of the mining machine 20 is connected to the receiving end 26 of the bridge conveyor 27 by a hanger 40 which comprises a rectangular plate 41 having secured to the underside thereof an arcuate guide 42 formed with an upwardly extending lip 43 forming a channel which is complementary to the lip 38 on the underside of the track member 37 for engagement therewith. The arcuate guide 42 is secured to the plate 41 by suitable bolt means 44. An upstanding hook element 45 is welded to each end of the plate 41 in parallel, spaced relation with the open side of each hook 45 directed towards the mining machine 20. The projecting ends 32 of the head shaft 31 are engaged by the hooks 45, and a pin 46 is inserted into bores in each hook 45 to secure the shaft 31 in assembly therewith.

The plate 41 seats on the supporting track member 37 and the arcuate guide 42 secures the hanger 40 to the track member 37, thereby connecting the receiving end 26 of the bridge conveyor 27 to the discharge boom 25 of the mining machine 20. Thus, as the mining machine 20 is advanced into the mine face the bridge conveyor 27 will be moved forwardly therewith. The circular track member 37 and the connecting arcuate guide 42 permit swinging movement of the bridge conveyor 27 laterally relatively to the mining machine 20, as illustrated in FIG. 1 in dotted lines. The track member 37 has stop blocks 47 disposed at the ends thereof, which are adapted to abut the ends of the plate 41 of the hanger 40 as the bridge conveyor 27 is swung laterally relatively to the mining machine 20, with the swinging movement of the bridging conveyor 27 being thereby limited to a 90° arc on either side of the longitudinal center line of the mining machine 20.

The assembly of the hanger 40 and the head shaft 31 provides a pivotal conection of the mining machine 20 to the bridge conveyor 27, with the axis of the shaft 31 being the pivoting axis. In the mining operation the mining machine 20 follows the coal seam in advancing through the mine. This seam does not follow a level path, but may rise or fall, and accordingly the mining machine 20 is directed upwardly or downwardly. It follows from this, as well as other factors, that the floor of the mine will not be truly level but will be uneven, and for this reason the aforementioned pivotal connection of the bridge conveyor 27 to the mining machine 20 is provided. Thus the mining machine 20 may be disposed in a tilted plane while the bridge conveyor 27 is disposed in a level plane, and the pivotal connection between the hanger 40 and the mining machine 20 permits such disposition of the mining machine 20 and the bridge conveyor 27.

The frame 35 of the bridge conveyor 27 is provided with a flat plate bottom 50 at the receiving end 26. The plate bottom 50 is in the nature of a skid surface which may be utilized to support the bridge conveyor 27 on the floor of the mine. However, due to the unevenness of the floor of the mine, the plate bottom 50 will not always be in contact therewith and at such times the bridge conveyor 27 is supported by the hanger 40 solely on the discharge boom 25 of the mining machine 20.

The plate bottom 50 extends rearwardly and forms a deck 51 which is disposed above the plane of the plate bottom 50. The deck forms a supporting surface for an electric motor 52, which drives the bridge conveyor 27. A chain 53 connects the motor 52 to sprocket 55 on the end of the drive shaft 54. Each of the opposite ends of the drive shaft 54 includes a chain sprocket 56 adapted to drive the conveying element 60 of the bridge conveyor 27.

The bridge conveyor 27 includes a conveying element 60 having endless chains 61, disposed one at each side of the bridge conveyor 27, and having flights 62 secured to and extending transversely between the chains 61. The chains 61 are engaged with the sprockets 56 on the drive shaft 54 and are driven thereby. A chain guide 63 is provided at each side of the bridge conveyor 27 and serves to maintain the chains 61 in driving engagement with the sprockets 56. The bridge conveyor 27 is formed with a conveyor bed 64 extending the length of the bridge conveyor 27. The flights 62 of the conveying element 60 are moved along over the bed and sweep the material thereover to move the material from the receiving end 26 of the bridge conveyor 27 to the discharge end 28.

At each side of the conveyor bed 64 there is provided a pair of rails 65, located one above the other, for guiding the chains 61 and maintaining the conveying element 60 centered on the conveyor bed 64. The rails 65 each engage the chains 61 between the side bars thereof so that the chains 61 cannot shift laterally on the conveyor bed 64. The bridge conveyor 27 also includes a deck 66 extending rearwardly from the drive shaft 54 for the remainder of the length of the bridge conveyor 27. The deck 66 supports the return run of the conveying element 60. At the receiving end 26 of the bridge conveyor 27 the plate bottom 50 serves to support the return run of the conveying element 60. Any slack that may be present in the conveying element 60 will occur in the area between the chain guides 63 and the plate bottom 50. The deck 66 and the plate bottom 50 include rails 67 disposed one at each side thereof for guiding the return run of the conveying element 60. An idler shaft 68 at the receiving end 26 of the bridge conveyor 27 guides the conveying element 60 to the deck 64.

Referring to FIGS. 6 to 10, there is illustrated the discharge end 28 of the bridge conveyor 27 and the connection thereof to the pan conveyor 29. The discharge end 28 comprises an idler shaft 72 about which the conveying element 60 is entrained to guide the chains 61 thereof from the bed 64 to the deck 66.

The pan conveyor 29 is supported on the mine floor by means of transverse tubular elements 73 welded to the bottom of the pan conveyor 29. A pair of oppositely disposed, longitudinally extending angle members 74 form the bottom of the pan conveyor 29 with the upstanding legs of the angle members 74 being disposed at the sides of the pan conveyor 29, and the laterally disposed legs of the angle members 74 being directed inwardly towards each other to form a support for the flights 75 of the conveying element 76, the flights 75 extending transversely to either side of an endless chain 77. The bed 78 of the pan conveyor 29 comprises a center portion which is flat and disposed above the angle members 74. The sides 79 of the bed 78 extend upwardly and outwardly with the edges thereof folded over to form rails 80 extending the length of the pan conveyor 29 at the top thereof.

The pan conveyor 29 comprises a plurality of like sections the ends of which each includes flanges 81 for joining the adjacent sections of the pan conveyor 29 to each other by means of bolts 82. As many sections as desired may be joined one to the other to form the pan conveyor 29 so that it may extend any desired length through the mine. As the mining operation progresses, the bridge conveyor 27 will reach the end of the pan conveyor 29 and, at that time, additional conveyor sections are added to the pan conveyor 29 to increase the length thereof and permit the mining operation to progress further.

A carriage 30 is supported on the rails 80 at the top of the pan conveyor 29 by means of rollers 86, which ride on the rails 80. The carriage 30 comprises a frame member 87 on which the rollers are mounted by means of forwardly and rearwardly extending legs 88. Supported by the frame 87 is a track 89 formed on the arc of a circle and which extends to three sides of the frame 87 through an arc of approximately 270°. A hopper 90 is disposed within the track 89 and is directed downwardly towards the bed 78 of the pan conveyor 29, to direct the material discharged by the bridge conveyor 27 to the conveying element 76 of the pan conveyor 29. The track 89 comprises a support 91 disposed at the periphery of the track 89 and an upstanding arcuate element with a laterally directed lip 92. An arcuate guide 93 is seated on the support 91 and is engaged under the lip 92. Upstanding ears 94 are welded one to each end of the arcuate guide 93, and pivotally secured to each ear 94 there is provided an arm 96 extending towards the bridge conveyor 27.

The ends of the arms 96 are welded to the opposite ends of a tubular member 97. Abutments 98 are welded to the top of the tubular member 97, and between the abutments 98 there is welded a pin 99, the axis of which extends longitudinally of the bridge conveyor 27. The pin 99 extends to either side of the tubular member 97. One half of a bearing block 100 is welded to the underside of the deck 66 on either side of the pin 99. A cap 101 is secured to each bearing block 100 by bolts 104 forming a bearing between the bearing block 100 and the cap 101 for the ends of the pin 99 on either side of the tubular member 97.

The pan conveyor 29 is fixedly supported on the floor of the mine. However, the bridge conveyor 27 travels in accordance with the advance of the mining machine 20. As previously explained, due to the unevenness of the mine floor, the bridge conveyor 27 will not follow a level path. Accordingly, the pivot connection of the bridge conveyor 27 to the pan conveyor 29 through the arms 96 and the pins 95 permits the bridge conveyor 27 to shift relatively to the pan conveyor 29 about an axis extending laterally of the bridge conveyor 27. The bridge conveyor 27 may also shift relatively to the pan conveyor 29 about an axis extending longitudinally of the bridge conveyor 27, by pivoting movement of the bridge conveyor 27 on the supporting pin 99. The upper surfaces 102 of the abutments 98 are formed at an angle with respect to the axis of the tubular member 97 and with respect to the bottom of the bridge conveyor 27 when the latter is disposed in a horizontal plane. The included angle between the top surface 102 of each abutment 98 and the bottom of the bridge conveyor 27 is the limit of the oscillation of the bridge conveyor 27 on the pin 99. Plates 103 are welded to the bottom of the bridge conveyor 27 and serve as stop elements adapted to abut the top surfaces 102 of the abutments 98 and thereby limit the oscillation of the bridge conveyor 27 relatively to the pan conveyor 29.

The carriage 30 supports the discharge end 28 of the bridge conveyor 27 on the pan conveyor 29 with the connection of the bridge conveyor 27 to the carriage being effected through the guide plate 93. The guide plate 93 is supported on the arcuate support 91 formed at the edge of the circular track 89, and the bridge conveyor 27 is thereby adapted to swing laterally relatively to the pan conveyor 29 through an arc extending 90° to either side of the longitudinal center line of the pan conveyor 29. In all positions of the bridge conveyor 27 relative to the pan conveyor 29 the bridge conveyor is adapted to pivot about the pivot pins 95 and the pin 99 to shift relatively to the pan conveyor 29 in accordance with the level of the surface on which the bridge conveyor 27 or the mining machine 20 is disposed.

The bridge conveyor 27 comprises one end section forming the receiving end 26 and another end section forming the discharging end 28, and intermediate the ends of the bridge conveyor 27 it is composed of like conveyor frame sections 105, any number of which may be assembled end to end to form the bridge conveyor 27 to any desired length in accordance with dictates of the mining operation being undertaken. Each end of the conveyor frame sections 105 is formed on an oblique laterally directed plane, with a flange 106 extending laterally beyond the side of the frame section 105, one such flange 106 being formed on each side of the flange section 105 at each end thereof. As seen in FIG. 6, the flanges 106 are formed on the oblique plane in which the end of the frame section 105 is formed. The flanges 106 on adjacent frame sections 105 include aligned bores 107 for the reception of bolts 108 joining the flanges 106 and thereby securing adjacent frame sections 105 one to the other in line. It will be understood that the receiving end 26 and the discharging end 28 of the bridge conveyor 27 are likewise formed with obliquely extending flanges 106 so that they may be secured to the intermediate conveyor frame sections 105. By forming the joints between the frame sections 105 in an oblique plane, as described, these joints are materially strengthened for the purpose of rigidifying the bridge conveyor 27 and preventing sagging thereof.

A modification of the invention is illustrated in FIGS. 12 to 16. Referring first to FIGS. 12 and 13, it is seen that the discharge boom 25 of the mining machine 20 has welded thereto a hanger 110, of a generally U configuration in plan view, extending laterally across the end of the discharge boom 25. At the center of the hanger 110 there is formed a clevis 111 extending rearwardly therefrom and opening towards the bridge conveyor 27. A cantilever arm 112 is formed on the receiving end 26 of the bridge conveyor 27 extending in the direction of the mining machine 20. The end of the arm 112 is formed with a tongue 113 received within the clevis 111. The clevis 111 is formed with bores 114 which are aligned with each other, and the tongue 113 is formed with an enlarged bore 115 adapted to be aligned with the bores 114. A pin 116 is seated on the top of the clevis 111 and is received in the bores 114, 115 to secure the tongue 113 within the clevis 111 and to provide a pivotal connection of the bridge conveyor 27 to the mining machine 20, to permit the bridge conveyor 27 to swing laterally relatively to the mining machine 20.

The clevis 111 is somewhat larger than the tongue 113, as seen in FIG. 16. Also, the bore 115 has a substantially larger diameter than the pin 116. The bore 115 has a central portion 117 with a cylindrical configuration and the portions 118 of the bore 115 on either side of the central portion 117 have conical configurations diverging outwardly from the central cylindrical portion 117. With this construction there is provided a loose connection of the bridge conveyor 27 to the mining machine 20. The bridge conveyor 27 is permitted to swing laterally relatively to the mining machine 20, and may also shift freely about axes extending laterally and longitudinally of the bridge conveyor 27 due to the loose fit of the pin 116 in the enlarged bore 115. The hanger 110 is constructed to support the bridge conveyor 27 through the arm 112, when the bridge conveyor is not supported on the floor of the mine.

The discharge end 28 of the bridge conveyor 27 in the modified form of the invention comprises a connecting member 120 extending rearwardly therefrom. The connecting member 120 extends generally laterally across the discharge end 28 of the bridge conveyor 27, and is formed at its center with a connecting pin 121 welded thereto. The carriage 30 on the pan conveyor 29 includes an upstanding support 122 formed with a supporting arm 123 extending towards the discharge end 28 of the bridge conveyor 27. The end of the supporting arm 123 is formed with a bore 124 within which there is received the pin 121. The bore 124 is substantially larger than the diameter of the pin 121, and is formed with exactly the same configuration as the bore 115, previously described in connection with the receiving end 26 of the bridge conveyor 27. There is thus provided a loose connection of the bridge conveyor 27 to the pan conveyor 29, which permits the bridge conveyor 27 to shift freely relatively to the pan conveyor 29 about axes extending laterally and longitudinally of the bridge conveyor 27 so that there may be proper adjustment of the relative disposition of the units of the conveyor assembly in accordance with the terrain on which the machines are disposed.

The conveyor assembly of this invention comprises a bridge conveyor which is adapted to connect the discharge end of a continuous mining machine to a stationary pan conveyor in the mine, for delivering the mined material from the mining machine to the pan conveyor, which removes the material from the mine, or may deliver the material to a point at which it can be discharged to conveyances which remove the material from the mine. The bridge conveyor is supported on the discharge end of the mining machine and also on the pan conveyor so as to be suspended therebetween. The connection between the mining machine and the bridge conveyor causes the bridge conveyor to be advanced as the mining machine advances, and the connection of the bridge conveyor to the pan conveyor includes a carriage which permits the bridge conveyor to be pulled along the length of the pan conveyor as the bridge conveyor advances with the mining machine. The means connecting the bridge conveyor to the mining machine and the pan conveyor permits the bridge conveyor to shift freely relatively to the mining machine and to the pan conveyor in accordance with the uneven terrain encountered in the mine. The bridge conveyor is also supported on the mining machine and the pan conveyor for swinging movement relatively to each of the mining machine and the pan conveyor, so that the bridge conveyor is free to follow the mining machine in all lines of advance thereof.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a conveyor assembly comprising a bridge conveyor adapted to connect a mining machine to a pan conveyor, said mining machine comprising a conveyor discharging mined material at the rear of the machine, means connecting the receiving end of the bridge conveyor to the rear of the mining machine to follow the mining machine and to receive the material discharged thereby, the bridge conveyor including means at its discharge end connecting the bridge conveyor to the pan conveyor for delivering the mined material to the pan conveyor, the last said connecting means including a supporting arm carried by the pan conveyor and extending over the pan conveyor and formed with a socket, a pin on the discharge end of the bridge conveyor adapted to be seated in the socket for connecting the discharge end of the bridge conveyor to the supporting arm for support of the discharge end of the bridge conveyor by the supporting arm, the socket being substantially larger than the pin for free shifting of the bridge conveyor relatively to the pan conveyor.

2. In a conveyor assembly comprising a bridge conveyor adapted to connect a mining machine to a pan conveyor, said mining machine comprising a conveyor discharging mined material at the rear of the machine, means connecting the receiving end of the bridge conveyor to the rear of the mining machine to follow the mining machine and to receive the material discharged thereby, the bridge conveyor including means at its discharge end connecting the bridge conveyor to the pan conveyor for delivering the mined material to the pan conveyor, the last said connecting means including a carriage adapted to ride along the pan conveyor, said carriage including a supporting arm formed with a socket centrally disposed with respect to the pan conveyor, the discharge end of the bridge conveyor including a pin adapted to be seated in the socket for connecting the discharge end of the bridge conveyor to the supporting arm for support of the discharge end of the bridge conveyor by the supporting arm, the socket being substantially larger than the pin for free shifting of the bridge conveyor relatively to the pan conveyor.

3. In a conveyor, a frame for supporting a conveying means, said frame comprising a plurality of like sections joined end to end, the ends of said frame sections each including flanges formed on planes extending obliquely with respect to a transverse upright plane, and means disposed along said flanges joining the flanges of adjacent frame sections.

4. In a conveyor, a frame for supporting a conveying means, said frame comprising a plurality of like sections joined end to end, the ends of said frame sections being formed on planes extending obliquely with respect to a transverse upright plane, the ends of said frame sections each including flanges formed on said obliquely extending planes, and means disposed along said flanges joining the flanges of adjacent frame sections.

References Cited in the file of this patent

UNITED STATES PATENTS

| | | |
|---|---|---|
| 993,737 | Thurman | May 30, 1911 |
| 1,272,564 | Stuart | July 16, 1918 |
| 1,418,724 | MacGregor et al. | June 6, 1922 |
| 1,605,507 | Burke | Nov. 2, 1926 |
| 1,818,168 | Smith | Aug. 11, 1931 |
| 2,604,201 | Gleeson | July 22, 1952 |
| 2,629,484 | Thomson | Feb. 24, 1953 |
| 2,747,721 | Long et al. | May 29, 1956 |
| 2,789,682 | Laskauskas | Apr. 23, 1957 |

FOREIGN PATENTS

| | | |
|---|---|---|
| 10,182 | Great Britain | June 22, 1889 |